United States Patent [19]

Diesel et al.

[11] Patent Number: 5,527,003
[45] Date of Patent: Jun. 18, 1996

[54] METHOD FOR IN-FIELD UPDATING OF THE GYRO THERMAL CALIBRATION OF AN INTERTIAL NAVIGATION SYSTEM

[75] Inventors: John W. Diesel, Woodland Hills; Gregory P. Dunn, Northridge, both of Calif.

[73] Assignee: Litton Systems, Inc., Woodland Hills, Calif.

[21] Appl. No.: 281,349

[22] Filed: Jul. 27, 1994

[51] Int. Cl.$^6$ .............................. B64C 17/06; G05D 1/00; G01C 21/00
[52] U.S. Cl. ..................... 244/195; 244/76 R; 244/79; 364/453
[58] Field of Search .................. 244/75 R, 76 R, 244/76 B, 175, 194, 195, 79; 364/447, 453

[56] References Cited

U.S. PATENT DOCUMENTS

| | | | |
|---|---|---|---|
| 3,657,918 | 4/1972 | Hurlbert . | |
| 3,788,579 | 1/1974 | Sliney . | |
| 4,106,094 | 8/1978 | Land | 364/453 |
| 4,254,465 | 3/1981 | Land | 364/453 |
| 4,303,978 | 12/1981 | Shaw et al. | 364/453 |
| 4,608,641 | 8/1986 | Shell | 364/453 |
| 5,008,825 | 4/1991 | Nadkarni et al. | 244/178 |
| 5,166,882 | 11/1992 | Stambargh | 364/453 |
| 5,194,872 | 3/1993 | Mussoff et al. | 364/453 |
| 5,410,487 | 4/1995 | Okayama et al. | 364/453 |

FOREIGN PATENT DOCUMENTS

| | | | |
|---|---|---|---|
| 617259 | 9/1994 | European Pat. Off. | 364/453 |
| 8600158 | 1/1986 | WIPO | 364/453 |

OTHER PUBLICATIONS

Article—John W. Diesel, "Calibration of a Ring Laser Gyro Inertial Navigation System for Minimum Velocity Error," Fourteenth Biennial Guidance Test Symposium, vol. II, Oct. 3–5, 1989 pp. 1–1 through 1–20.
Article—John Mark, Daniel Tazartes and Timothy Hilby, "Fast Orthogonal Calibration of a Ring Laser Strapdown System," Stuttgart, Germany (Sep. 1986).

*Primary Examiner*—Andres Kashnikow
*Assistant Examiner*—Virna Lissi Mojica
*Attorney, Agent, or Firm*—Elliott N. Kramsky

[57] ABSTRACT

An in-field method for correcting the thermal bias error calibration of the gyros of a strapdown inertial navigation system. The method is begun after initial alignment while the aircraft remains parked with the inertial navigation system switched to navigation mode. Measurements are made of navigation system outputs and of gyro temperatures during this data collection period. A Kalman filter processes the navigation system outputs during this time to generate estimates of gyro bias error that are associated with the corresponding gyro temperature measurements. Heading error correcting is performed after the extended alignment data collection period as the aircraft taxis prior to takeoff. The gyro bias error-versus-temperature data acquired, along with the heading error corrections, are employed to recalibrate the existing thermal model of gyro bias error by means of an interpolation process that employs variance estimates as weighting factors.

18 Claims, 7 Drawing Sheets

METHOD FOR IN-FIELD UPDATING OF THE GYRO THERMAL CALIBRATION OF AN INTERTIAL NAVIGATION SYSTEM

BACKGROUND

1. Field of the Invention

The present invention relates to a method for calibrating the gyros of a strapdown aircraft inertial navigation system ("INS"). More particularly, this invention pertains to a method for continual in-field updating of the gyro thermal model calibration.

2. Description of the Prior Art

Aircraft inertial navigation relies upon the integration of data throughout a sequence that is begun when the aircraft is prepared for takeoff and which ends when the aircraft has landed and motion has ceased. The inertial navigation apparatus of an aircraft includes various components, including accelerometers and gyroscopes, that convert the effects of inertial forces into acceleration, velocity and position measurements. The accelerometers determine acceleration forces along three orthogonal sensitive axes and this data is converted, through integrations, into the aircraft's velocity and position. In a strapdown system in which the accelerometers are fixed in relation to the geometry of the aircraft, the gyroscopes that measure the aircraft's attitude also measure that of the accelerometer platforms. The data measured by the gyros is utilized to resolve the accelerometer outputs continuously along the appropriate space axes.

The standard inertial instruments are well-suited for obtaining the necessary flight data in an aircraft when airborne. However, important calibration processes must take place at the beginning of the flight and prior to the airborne phase to assure that the ultimate measurements of acceleration, velocity and position are substantially free of inaccuracy and bias. Thus, during initial alignment, the precise locations and attitudes of the inertial navigation instruments must be determined and/or entered into the flight computer, a process that corresponds to the "leveling of the reference platform" that takes place in a non-strapdown or gimballed navigation system.

After initial instrument alignment, the flight computer enters the navigation mode and remains in this mode for the remainder of the flight. While in the navigation mode, the flight computer receives information from the accelerometers and keeps track of the attitudes of the inertial instruments by utilizing gyro outputs. Attitude information is provided through integration of rate signals received from the gyroscopes.

The initial alignment mode also offers an opportunity to correct navigation instrument errors. An important error of this sort is the body component of gyro bias error. This error refers to the fixed offset or bias of the angular rate gyro outputs along the aircraft's pitch and roll axes. Unfortunately, in the prior art it has only been possible to partially correct this error., Conventionally, this problem is addressed by resolving the gyro rates about the pitch and roll axes to a north and east system. A process known as "mini biasing" is then employed during alignment (and prior to taxiing) to correct the gyro components along the northern axis. Unfortunately, the error components along the east axis are unobservable during initial alignment. Such unobservability follows from the fact that the initial azimuth determination (i.e. gyrocompassing) utilizes the east component of the gyro outputs to determine azimuth since it is known that the east component of the Earth's angular rate should be zero. Thus, such components are assumed to be correct. That is, the direction of the Earth's rotation rate is employed to determine the initial azimuth of the instrument platform.

FIGS. 1(a) and 1(b) are top plan views of an aircraft during the alignment mode and the taxiing portion of the navigation mode respectively. As shown in FIG. 1(a), at the end of alignment the east component of gyro bias error, $\epsilon_{Eo}$, is balanced by the west component of the Earth's angular rate error $\delta\Omega_w$ ($=\phi_z \times \Omega_N$ where $\Omega_N$ is the north component of the earth's angular rotation rate) resulting from a residual azimuth error $\phi_z$. For this reason, velocity errors are not observed until the aircraft changes heading during the taxiing portion of the navigation phase. As shown in FIG. 1(b), when a change of heading occurs, the original east gyro bias error $\epsilon_{Eo}$ will rotate with the taxiing aircraft and will no longer lie in the east coordinate direction. The west component of the Earth's angular rate error, $\delta\Omega_w$, will continue to lie in the west coordinate direction as it is determined by the navigation reference axes rather than by the aircraft body axes.

The absence of a method for determining or, needless to say, correcting the east axis component of gyro error, $\epsilon_{Eo}$, can lead to significant difficulties during flight as this error will cause position errors to accumulate through the integration processes of aircraft navigation.

A method for overcoming the above-referenced inability to observe the east component of gyro bias error during the alignment phase is described by the inventor in "Calibration of a Ring Laser Gyro Inertial Navigation System For Minimum Velocity Error", *Fourteenth Biennial Guidance Test Symposium*, Central Inertial Guidance Test Facility, Guidance Test Division, 6585th Test Group, Holloman AFB, Vol. II (Oct. 3, 4, 5, 1989) at pages 1—1 through 1-20. That paper describes a system for inferring the original east component of gyro error $\epsilon_{Eo}$ through observations made during the post-alignment taxiing portion (i.e. as shown in FIG. 1(b)) of the navigation phase. The method operates upon the known relationship between the cross-heading velocity of a taxiing aircraft and the original east component of gyro bias error.

As mentioned earlier, once an aircraft begins taxiing and changes heading, the east component of gyro bias error and the west component of the Earth rotation rate error are no longer balanced as the original east component of gyro bias error rotates with the body of the aircraft while the west component of the Earth rotation rate error remains aligned with the reference system. As a consequence, north and east velocity errors begin to build up and those errors form the basis for the determination of the east component of the gyro bias error. Although the north and east velocity errors cannot be observed directly, the cross-track component of velocity error, $V_{CT}$, can be observed, and its relationship to the north and east velocity errors is known.

FIG. 2 is a top plan view of a taxiing aircraft for illustrating the above-described process for inertial instrument calibration in which the cross-track velocity $V_{CT}$ is employed as a surrogate for the north and east velocity errors. The method described in the above-identified paper relies upon the fact that the velocity in the cross-track direction (axis 2) should be zero as the cross-track direction is, by definition, perpendicular to the true velocity vector $V_G$. Because of the presence of the north and east velocity errors, $V_{CT}$ normally has a finite value. However, the value of $V_{CT}$ is itself corrupted by the presence of a number of errors, discussed below.

The inertial system 4 does not know the exact cross-track direction. However, when taxiing, the cross-heading direction (axis 6) differs from cross-track direction only by a small crab angle B as shown in FIG. 2. According to the above-identified paper, the cross-heading velocity $V_C$ is observed, and is then corrected by using an estimated crab angle $\beta$ to obtain estimated cross-track velocity $V_{CT}$. An additional correction is made for lever arm $R_L$ (the distance between the aircraft's center of rotation 7 and the inertial navigation system 4) and the cross-track velocity is then related back to the initial east component of gyro bias error. The necessary parameter determinations may be made through calculations performed on the aircraft with the flight or navigation computer. The crab angle error is estimated by observing the cross-heading velocity $V_C$ during periods when the ground speed is large. The estimated crab angle is then used to make corrections to cross-track velocity for estimating the initial east component of gyro error during periods when ground speed and turning rate are small.

A third important error source is essentially transient and random in nature. That error, $\delta V_n$, is due to lateral and rotational motions of the aircraft while taxiing. Such velocity transients can result from bumps in the runway and their effects upon the landing gear suspension system. A method of correcting for $\delta V_n$ is disclosed in pending U.S. patent application Ser. No. 08/039,725 of John W. Diesel entitled "Method For Calibrating Inertial Navigation Instruments of Aircraft." Such application is property of the assignee herein.

Laser gyros do not exhibit the random turn-on bias repeatability errors that characterize iron wheel gyros. Rather, for a given thermal environment, the gyro bias is very repeatable, and therefore predictable, at least in the short term. However, over the long term, the bias error characteristics gradually change. It is possible to calibrate gyro bias errors vs. temperature at the factory over a maximum temperature range, and to then compensate for such errors in the operational software. However, after a few hundred hours of operation the gyro thermal model will shift and the factory calibration may no longer be valid.

The mean time before repair ("MTBR") of the INS is therefore affected by the above-described drift of the gyro's thermal bias error characteristics. This has led to efforts to devise systems and methods for updating the thermal model during operation. Previous approaches in this regard include minibiasing at the end of alignment, post-flight updating, and updating using GPS. Such prior methods have been directed to adjusting a so-called "constant" bias ("DC") term that is independent of temperature. Those efforts are inherently inadequate as the gyro bias error model contains not only a DC term but also "AC" terms that comprise sinusoids or other functions of temperature. Thus, the thermal model shift problem cannot be completely addressed by them.

In-field INS thermal model updating faces many difficult problems. The correlation of GPS measurements with temperature is complicated, in a commercial airliner environment, by the "Selective Availability" (intentional signal degradation for non-military users) criterion that makes it almost impossible to update (the DC term) within a reasonable period of time. Updating of AC bias with temperature change poses an even more daunting task. Further, since the heading of a commercial airliner changes slowly on a normal great circle flight, the separation of the east component of gyro bias error from heading error would be impractical. Finally, temperatures generally change very slowly during flight, thereby complicating the separation of DC from AC terms.

The possibility of correlating minibias measurements with temperature (or other parameters) and updating the bias model with each new data point is complicated, and rendered impractical, by the fact that the DC bias, as well as the AC sinusoid, changes from flight to flight. It is, of course, not possible to ascertain the shape of the AC component from a single measurement of the sum of the DC and AC components. Further, as in the case of GPS updating, minibiasing does not separate the east component of gyro bias error from heading error. Finally, were a single measurement to be taken per flight, measurements would tend to occur at nearly-identical temperatures from flight to flight.

SUMMARY AND OBJECTS OF THE INVENTION

It is therefore an object of the present invention to provide a method for in-field updating of the gyro bias error thermal model calibration of the gyros of a strapdown aircraft inertial navigation system.

It is another object of the invention to provide a method in accordance with the foregoing object that includes a correction for the AC portion of gyro bias error.

It is yet another object to provide a method that may be employed to update gyro bias error thermal calibration prior to each flight on a continuing basis.

The present invention addresses the preceding objects by providing, in a first aspect, a method for correcting gyro outputs in a strapdown aircraft inertial navigation system of the type that includes an associated existing thermal gyro bias error model calibration. The method is begun by orienting the aircraft to an initial alignment heading and then actuating the system to navigation mode. Thereafter, measurements of angular rate and linear acceleration in the aircraft body axes are received from the system at regularly-spaced points in time and the temperatures of the gyros of the strapdown system are detected at those points in time.

Aircraft accelerations with respect to a computed platform reference are determined from the angular rate and linear acceleration measurements. Thereafter, acceleration rate errors in the gyro outputs are determined from the accelerations with respect to the computed platform axes. Tilt rates are determined from the acceleration rate errors and the above-described process is repeated throughout and until completion of the extended alignment period to generate a first set of data points. Each such data point comprises an associated pair of gyro tilt rate and temperature. Each tilt rate is converted into a gyro bias error and stored as a second set of data points.

The aircraft is then taxied and a heading error is determined by estimating cross-track velocity during taxiing. This error is subtracted from each of the second set of data points to generate an adjusted gyro bias error. The adjusted gyro bias errors are stored as a third set of data points that is incorporated into the existing gyro bias error calibration to form an updated calibration. The temperatures of the gyros are continuously measured and the angular rate outputs of the gyros are repeatedly adjusted by means of gyro bias error values selected from the updated calibration in view of the measured gyro temperatures.

In a second aspect, the invention provides a method for in-field updating of the gyro bias error-versus-temperature calibration of an aircraft strapdown inertial navigation system that comprises a plurality of bias error values associated with gyro temperatures. The method of the invention is begun by performing an initial alignment. Thereafter, the navigation system is turned to the navigation mode and the temperatures of the gyros of the inertial navigation system are then measured while the aircraft is in the initial alignment heading. Estimates of gyro bias error are made at this time. Thereafter, the estimates of gyro bias error are associated with the temperature measurements.

The heading of the aircraft is changed and it is taxied. During this time, the aircraft heading error is estimated and then substracted from each of the estimates of gyro bias error to generate a plurality of updated gyro bias error-and-temperature data points. Such updated gyro bias error-and-temperature data points are interpolated to generate updated values of gyro bias error that correspond to the temperature values of an existing gyro bias error-versus-temperature calibration. The existing calibration is then adjusted by means of the updated values of gyro bias error.

In a third aspect, the invention provides a method for correcting the gyros of a strapdown inertial system for temperature-induced gyro bias errors. Such method is begun by generating an initial thermal model calibration. The inertial navigation system is then set to the alignment mode and an initial alignment is performed.

The inertial navigation system is then switched to navigation mode. Outputs of the inertial navigation system and temperatures of the gyros are measured while the aircraft is still in the initial alignment heading. A set of values of gyro bias error is then generated from the measured outputs and each value of gyro bias error is associated with a measured gyro temperature.

The heading of the aircraft is then changed and the aircraft taxied. The output of the inertial navigation system is measured at this time and the heading errors of the gyros are determined. Such heading errors are subtracted from the values of gyro bias error to create a set of gyro bias errors with associated gyro temperatures. Such set of values is interpolated to the temperatures of the initial thermal model calibration. An updated thermal model calibration is then created by incorporating the interpolated values into the initial thermal model calibration.

The aircraft is then flown and the temperatures of the gyros are measured. Gyro bias errors are determined from the updated thermal model calibration by correspondence to measured temperatures and the gyro outputs are compensated in accordance with the determined gyro bias errors.

The preceding and other features and advantages of this invention will become further apparent from the detailed description that follows. Such description is accompanied by a set of drawing figures. Numerals of the drawing figures, corresponding to those of the written description, point to the features of the invention with like numerals referring to like features throughout both the written description and drawings.

DETAILED DESCRIPTION

The present invention provides a method for in-field updating of the thermal model calibration of the angular rate outputs of the gyros of an aircraft's strapdown INS. The bias error-versus-temperature characteristic of each gyro is updated while the aircraft is on the ground for correcting gyro data output during the subsequent flight. As a consequence, the amount of aircraft "down time" for factory calibrations is minimized while navigation accuracy is continually updated. The adjustment of the thermal model calibration takes place during the so-called "extended alignment period" that precedes taxiing motion. During this limited period of time, the inertial navigation system is operated as gyro temperatures are measured. Measurement data provided by the inertial navigation system is analyzed to generate updated gyro bias error estimates. The updated thermal bias data is incorporated into the existing (i.e. previous flight's) thermal model calibration by interpolation to create a new thermal model. Gyro output data is corrected during the ensuing flight by reference to the new thermal model calibration.

Figure 1A:
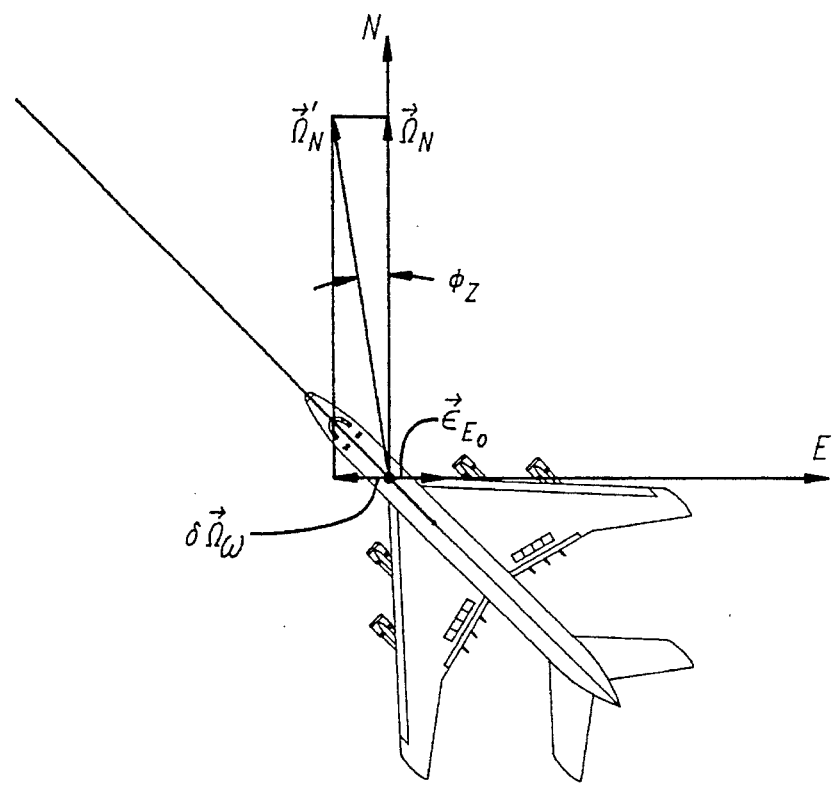
FIGS. 1(a) and 1(b) are top plan views of an aircraft during the alignment mode and the taxiing portion of the navigation mode respectively for use in illustrating the observability of the east component of gyro bias error.
Figure 3:
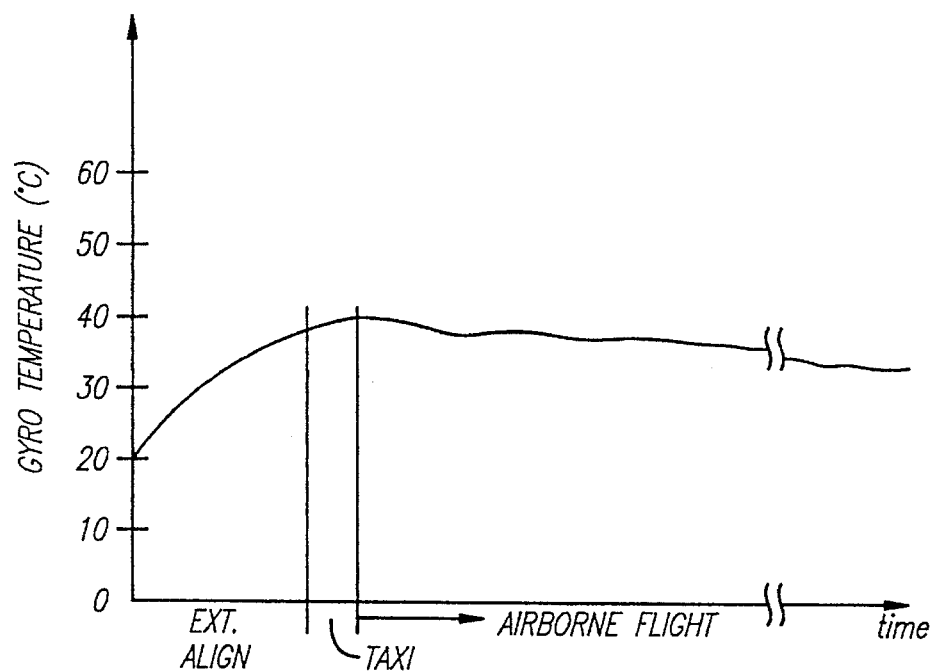
FIG. 3 is a graph of gyro temperature as a function of time with reference to operational modes of an aircraft.

It is well known that commercial airliners routinely remain stationary, in the initial alignment heading as shown in FIG. 1(a), with the INS turned-on for long periods of time prior to taxiing. The time from system turn-on to the beginning of taxiing is generally on the order of thirty (30) minutes or more, during which the temperatures of the inertial navigation instruments, including the gyros, change. The method of the invention relies upon the inventor's insight that, during the extended alignment period, the inertial navigation instruments are exposed to a range of temperatures that is likely to include the temperature range of the subsequent flight. FIG. 3 is a diagram of the temperature profile of a typical aircraft taken from the time of INS turn-on through flight. As can be seen, a "cold" INS undergoes a relatively pronounced temperature increase through initial and extended alignment and taxiing. A moderate cooling process is likely to follow during flight. It is significant to note that one can often expect to experience the entire range of gyro in-flight temperatures during extended alignment.

I. In-Field Updating of Thermal Model Calibration

Figure 1B:
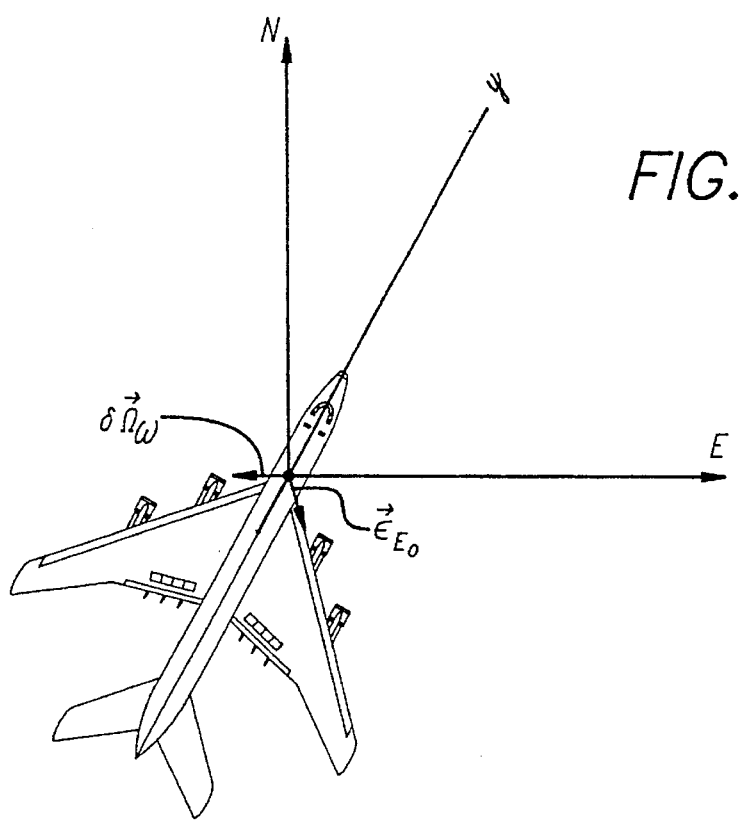
Figure 2:
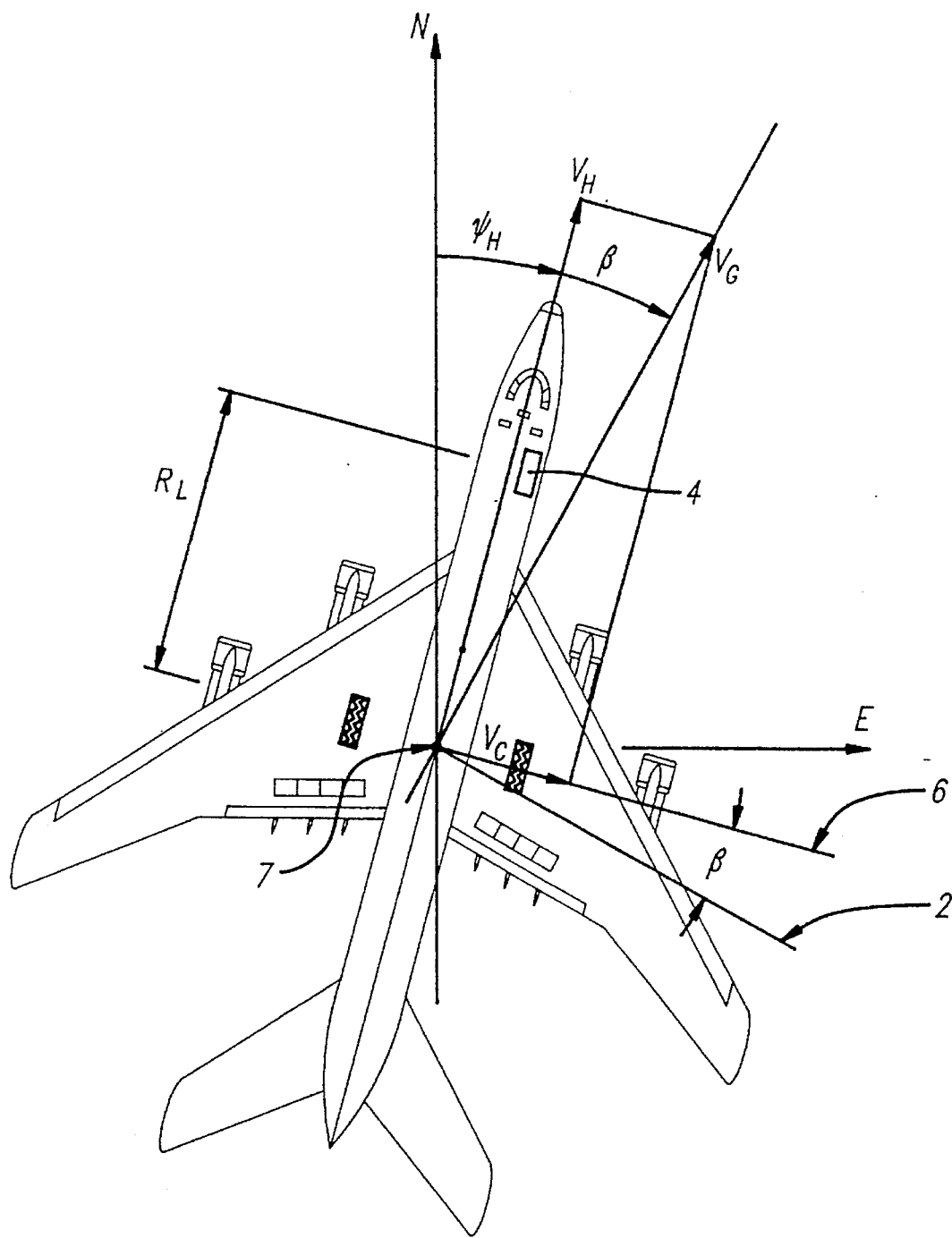
FIG. 2 is a top plan view of an aircraft for illustrating aircraft inertial instrument calibration by measurement of cross-track velocity during taxiing to correct for the east component of gyro bias error.

The present invention employs measurements of computed platform acceleration rate collected on a periodic basis (e.g. every five minutes) during the extended alignment period when the navigation system is "on", the initial alignment mode (described above) completed, and the aircraft stationary and in the initial alignment heading as illustrated in FIG. 1(a). As noted, instrument temperatures are normally changing most rapidly during this period. In the invention, the measurements of acceleration rate for both level (x, y) axis gyros, along with the temperatures at which they occur, are made and stored. As will be discussed below, the acceleration rate measurements are employed to determine the level axis gyro bias errors which are then corrected for the unknown fixed offset (i.e. DC component of gyro bias error) due to heading error. As discussed with relation to FIGS. 1(a) and 1(b), the offset due to heading error may be determined during the subsequent taxiing of the aircraft. The "combined" corrections are then employed to update the most recent system calibration. As will later be seen, in updating the existing calibration by interpolation of the updated values generated in the field, use is made of variances associated with values of the existing thermal model calibration that reflect the frequency with which gyro bias errors have been updated at the various calibration temperatures. This allows for the possibility that only a limited temperature range (vis a vis the entire temperature range of the thermal model calibration) may be experienced during an extended alignment period preceding the current and/or prior flights of a particular aircraft. Such variance values are employed as weighting factors (which are updated from flight to flight) in an interpolation process for reconciling the fact that the computed data points are based upon measurements taken at regularly-spaced points in time while a factory thermal model calibration generally presents gyro bias values at regularly spaced temperature values. Once the values generated on the ground have been employed to update the existing thermal model calibration, post-takeoff corrections to the gyro outputs are made with reference to the new thermal model.

II. Estimation of Gyro Bias Errors

The method of the invention utilizes acceleration rate measurements made by the aircraft's INS on the ground as its temperature increases prior to flight as illustrated in FIG. 3. It is known in the art that acceleration rate outputs of a nominally-still aircraft reflect level axis rate errors. Such errors are, in turn, related to the level axis gyro bias error or tilt rate through the body-to-reference axis direction cosines $C_{xx}$, $C_{xy}$, $C_{yx}$ and $C_{yy}$. Other sources of tilt rate error, including level axis acceleration, velocity, tilt and heading errors (a D.C. error) are also determined and subtracted from the tilt rate values. The level axis acceleration, velocity and tilt errors are determined from measurements made while the aircraft remains at its initial alignment heading whereas the heading error, which is independent of temperature and therefore approximately constant during the extended alignment data collection period, is determined from measurements made thereafter.

III. Navigation System Architecture

Figure 4:
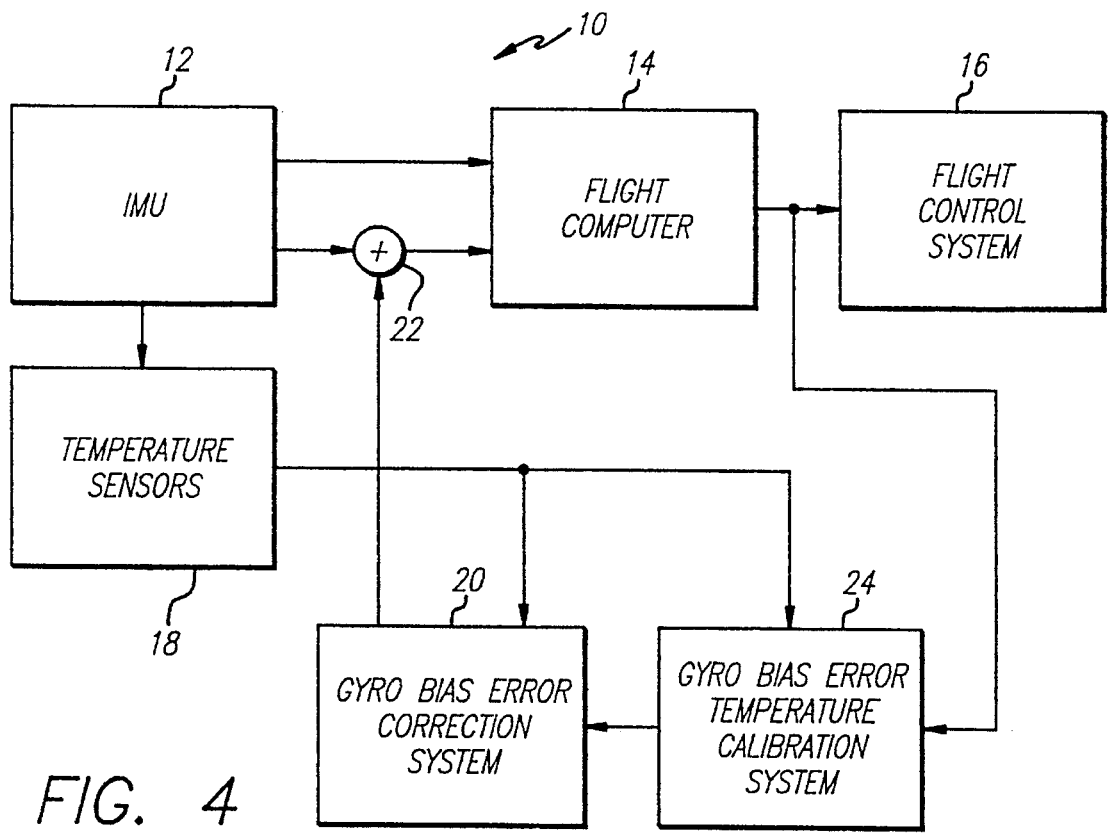
FIG. 4 is a diagram of the architecture of a navigation system with in-field updating of the thermal model gyro bias error calibration in accordance with the invention.

FIG. 4 is a diagram of the architecture of a navigation system that incorporates in-field updating of the thermal model calibration of gyro bias error in accordance with the invention. An inertial measuring unit ("IMU") 12 is strapdown-mounted to an aircraft and includes sets of gyros and accelerometers for providing the necessary measurements of rotation about and acceleration along the aircraft body axes. A flight computer 14 resolves such outputs to a system of reference axes by means of the above-discussed direction cosine transformation and performs successive integrations to provide velocity and position data as well as acceleration with regard to the reference axes. This data is directed to a flight control system 16 where it is utilized for various in-flight functions. The inertial navigation system, broadly defined, encompasses the IMU 12, the flight computer 14 and their functions.

Temperature sensors 18 are arranged to detect the temperatures of the gyros of the IMU from the beginning of the extended alignment period and through flight duration. During flight, a gyro bias error correction system 20, which stores the in-field recalibrated thermal model, continually receives gyro temperature information from the sensors 18 and, in response thereto, retrieves a corresponding updated gyro bias error correction and outputs it to a summing node 22. As a consequence, the IMU measurements when provided to the flight computer 14 include a temperature-adjusted bias error correction. Prior to takeoff, such corrections will be based upon an "existing" thermal model of gyro bias error stored in the gyro bias error correction system 20. After takeoff, gyro bias error corrections will incorporate in-field updated data in accordance with the invention.

A gyro bias error temperature calibration system 24 receives the outputs of the gyro temperature sensors 18 and, in accordance with the method described below, derives data for updating the existing thermal model stored within the gyro bias error correction system 20. The derivation of values for updating the thermal model calibration stored in the gyro bias error correction system 20 includes an interpolation process that incorporates a bias error variance weighting based upon the frequency of prior in-field calibration updates. The gyro bias error temperature calibration system 24 ceases to adjust the thermal model stored in the gyro error correction system 20 after takeoff.

IV. Thermal Model Recalibration

Figure 5:
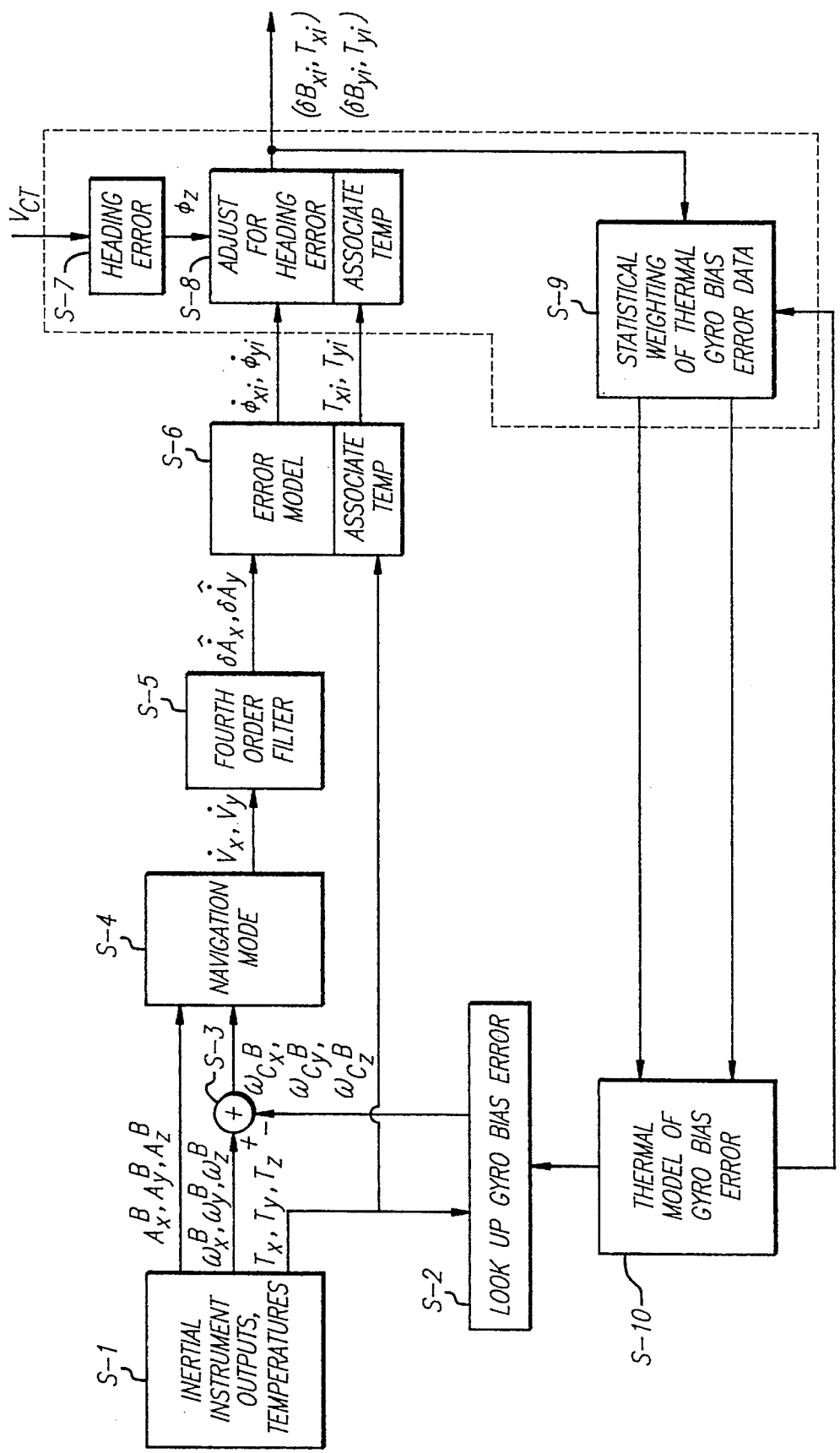
FIG. 5 is a flow diagram of the method of the invention for in-field updating of a thermal gyro bias error model calibration.

FIG. 5 is a flow diagram of the in-field thermal model recalibration method of the invention. The various functions disclosed in FIG. 5 are performed by apparatus in accordance with the prior figure. A number of symbols associated with measured and computed variables are indicated on the figure for assisting comprehension of the flow of information.

Otherwise-compensated values of acceleration $A_x^B$, $A_y^B$ and $A_z^B$, angular rate $\omega_x^B$, $\omega_y^B$ and $\omega_z^B$, as well as the temperatures $T_x$, $T_y$ and $T_z$ of the x, y and z axis gyros, respectively, are received from the INS and from the temperature sensors 18 at calibration update step S-1. The compensated angular rates are corrected in accordance with the existing thermal model to $\omega_{cx}^B$, $\omega_{cy}^B$ and $\omega_{cz}^B$ by "looking up" the appropriate values of gyro bias error stored in the thermal model calibration at step S-2 on the basis of measured gyro temperatures. The corresponding value of gyro bias error is employed, at summation node step S-3, to adjust the otherwise-compensated (i.e. corrected, e.g., for misalignment, scale factor etc.) angular rates.

The acceleration and angular rate values are input to the navigation mode of the INS at step S-4. A discussion of the mechanization of the navigation mode follows below. During the navigation mode, the accelerations with respect to a computed reference platform, $A_x$ and $A_y$ (or $\dot{V}_x$ and $\dot{V}_y$), are provided to a fourth order filter at step S-5.

The fourth order filter step S-5, also discussed in detail below, generates a number of error terms that follow from the presumed stability of the aircraft during extended alignment. Included among these are estimates of the acceleration rate error with respect to the computed platform axes, $\delta \hat{A}_x$ and $\delta \hat{A}_y$. These error terms are applied to an error model at step S-6. The error model transforms the estimated acceleration rate errors to adjusted tilt rates $\phi_{xi}'$, $\phi_{yi}'$, the subscript "i" indicating an estimate based on a measurement made at time i. At the same time, the temperatures of the gyros measured at that time $T_i$ are associated with the adjusted tilt rates.

A series of values of adjusted tilt rate is computed from measurements made during the extended alignment period. The presence of a non-zero tilt rate value indicates a gyro rate output when the computed platform should be steady and level. Some of this gyro output reflects the presence of a disturbance of the aircraft position. The remainder of the output represents gyro bias error. Values of gyro bias error are determined from the tilt rate values after accounting for (i.e. modeling out) factors unrelated to instrument error. This will be discussed in greater detail with reference to the error model of the navigation mode mechanization.

Determinations of tilt rate are made at regularly-spaced points in time i. The corresponding gyro temperatures, $T_{xi}$ and $T_{yi}$, sampled versions of the values measured by the temperature sensors 18, are associated with error model computations at step S-6. After the end of the extended alignment period (coinciding with the end of the data collection period for determining paired values of temperature and tilt rate), the paired data points are stored and then uniformly corrected for the above-discussed DC heading error component of gyro bias error. This correction is made after the extended alignment period has ended and the aircraft has moved from the initial alignment heading to taxi on the runway. As mentioned in the background, the east gyro bias error $\phi_z$ ("heading error"), the DC component of gyro bias error, can be ascertained from the value of cross-track velocity $V_{CT}$ based upon measurements of variables, such as crab angle $\beta$ and lever arm $R_L$, taken while the aircraft taxis. Heading error is determined accordingly at step S-7. The values of the tilt rates $\phi_{xi}$ and $\phi_{yi}$ determined from the error model at step S-6 are converted to gyro bias errors by a transformation disclosed with respect to the navigation mode error model (below) and such errors are converted to nominally AC gyro bias error values $\delta B_{xi}$ and $\delta B_{yi}$ by subtraction of the DC value, heading error $\phi_z$, at step S-8. Temperature values at each measurement time i, $T_{xi}$ and $T_{yi}$, are associated at step S-8 with each of the resulting computed values of AC gyro bias error $\delta B_{xi}$ and $\delta B_{yi}$ respectively. The data points ($\delta B_{xi}$, $T_{xi}$) and ($\delta B_{yi}$, $T_{yi}$) are then weighted at step S-9 in accordance with statistical measures (i.e. the variances $\delta \sigma_{xi}^2$ and $\delta \sigma_{yi}^2$) reflecting the frequency of updating of temperature regions of the existing thermal model calibration. Such weightings are employed for interpolation purposes in updating the thermal model at step S-10.

V. Navigation Mode

Figure 6:
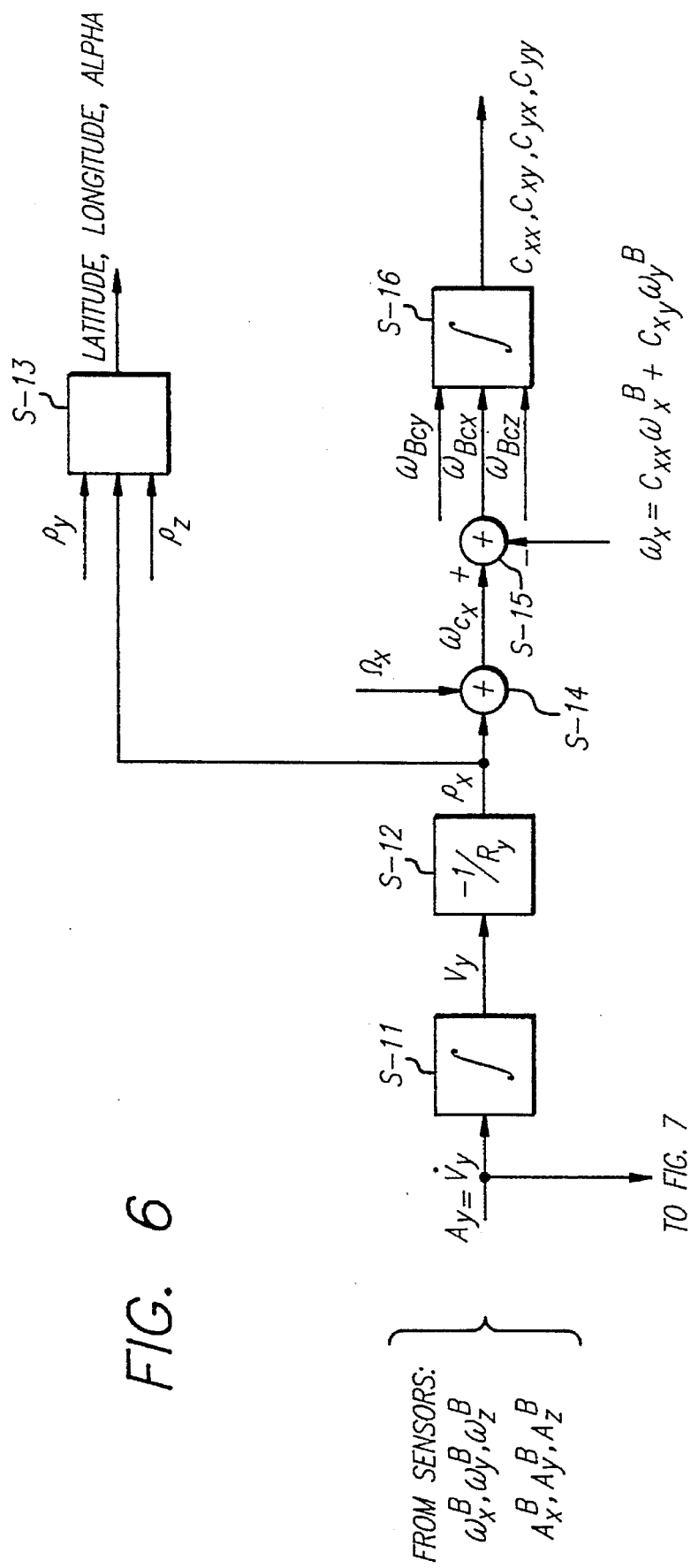
FIG. 6 is a mechanization diagram for illustrating the navigation mode of an aircraft.

FIG. 6 is a mechanization diagram for illustrating the navigation mode of the INS. The generation of updated values of gyro bias error is based upon data collected prior to flight while the INS is in the navigation mode. It is during this time that the gyros of the INS experience temperature profiles similar to that of FIG. 3 that permit generation of the set of updated bias error-versus-temperature data points at step S-8 of the preceding figure.

The INS, comprising the IMU 12 in combination with the flight computer 14, is automatically switched, in accordance with Federal regulations, from the initial alignment mode to the navigation mode ten (10) minutes after system turn-on. The present invention takes advantage of this happenstance prior to takeoff and the temperature cycling of the gyros that occurs at this time to generate new (updated) gyro bias error versus temperature values for modifying the existing thermal model calibration.

The flight computer 14 receives a set of rotations $\omega_x^B$, $\omega_y^B$ and $\omega_z^B$ sensed by the gyros of the IMU 12. (The superscript "B" indicates a value in the aircraft body axis reference system.) As mentioned above, if one assumes that the INS is not newly manufactured, the rotation data will incorporate corrections for temperature-related gyro bias based upon prior flights of the aircraft. Such data would then be stored in the existing thermal model calibration of the gyro error correction system 20 with the existing thermal model calibration incorporating values derived in prior in-field recalibrations. Acceleration values $A_x^B$, $A_y^B$ and $A_z^B$ in the aircraft body axis system are received at this time from the accelerometers of the IMU 12.

The mechanization of FIG. 6, and the following discussion thereof, will be arbitrarily referenced primarily to only one of the two platform reference data computation channels. While the discussion is thus abbreviated for purposes of clarity, it will be evident to those skilled in the art that a like exposition may be made of the mechanization of the navigation mode in regard to the other data computation channel with obvious, corresponding changes of notation.

The acceleration values are next converted by means of the direction cosines to a computed platform axis system discussed in the background. That is (for the y axis of the computed platform reference):

$$A_y = C_{yx} A_x^B + C_{yy} A_y^B \qquad (1)$$

The z axis measures azimuth while the x and y directions represent the level axes in the computed platform system. The z-axes of the computed platform and aircraft body systems are assumed to be sufficiently closely aligned so that only level axis transformations are significant.

The flight computer 14 integrates accelerations in the computed platform axes at step S-11 to provide a velocity $V_y$. This value is then converted to a corresponding craft rate $\rho_x$ by Schuler tuning at step S-12 using the well known Shuler transformation:

$$\rho_x = -V_y / R_y \qquad (2)$$

Where $R_y$ is the radius of curvature of the earth with respect to the y platform axis. The craft rate $\rho_x$ provides the aircraft's rate of change of position with respect to the earth. By then integrating the craft rate $\rho_x$ (likewise $\rho_y$) over the entire earth at step S-13 the position of the aircraft with respect to the earth (i.e., latitude and longitude) as well as an angle $\alpha$ (the wander azimuth north direction of the platform axis system in the earth's polar coordinates) are then obtained.

An angle $\omega_x$ defines the component of the earth rotation rate along the x platform reference axis. This is added to the craft rate $\rho_x$ at step S-14. The output of this summation represents the total angular rate of the platform axes. (Note: Both the craft rate from step S-12 and the earth rate $\omega_x$ are directly additive values as each is measured with respect to the same component in the same reference axis system.)

The summation at step S-14 is then differenced with the rotation rate of the platform about the x platform axis. This is determined from measurements of rotation about the aircraft body axes taken during extended alignment. That is:

$$\omega_x = C_{xx} \omega_x^B + C_{xy} \omega_y^B \qquad (3)$$

Where $\omega_x^B$ and $\omega_y^B$ are the measured values of B rotation about the x and y aircraft body axes obtained from the sensors of the INS. The output of the difference step S-15 is accordingly:

$$\omega_{Bcx} = p_x + \omega_x - (C_{xx}\omega_x^B + C_{xy}\omega_y^B) \quad (4)$$

Where $\omega_{Bcx}$ is the x axis component of the angular rate of change of the platform with respect to the aircraft body. Integration of the angular rates $\omega_{Bcx}$, $\omega_{Bcy}$ and $\omega_{Bcz}$ at step S-16 generates position values representing the orientations of the axes of the computed platform with respect to the aircraft body axes. This, of course defines the direction cosines discussed above.

Accordingly, the outputs of the integration transformation step S-16 provide updated values of the direction cosines $C_{xx}$, $C_{xy}$, $C_{yx}$ and $C_{yy}$. The calculated values are updated throughout the navigation mode including both the extended alignment mode and post-takeoff flight as the cosines are utilized throughout to calculate the aircraft's acceleration, position (latitude and longitude) and wander angle.

VI. Fourth Order Filter

Figure 7:
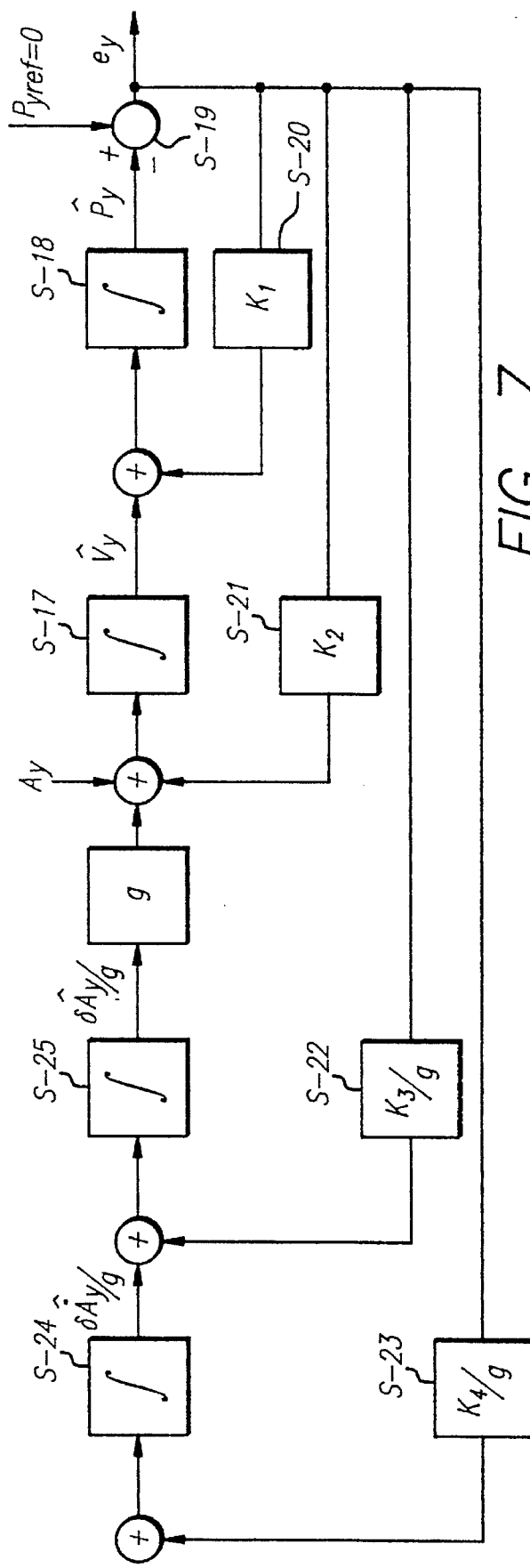
FIG. 7 is a mechanization diagram of a fourth order filter for processing navigation data to isolate measurement errors during extended alignment.

FIG. 7 is mechanization diagram of the fourth order filter for processing navigation data to derive level axis acceleration, velocity and tilt errors during the extended alignment period. Prior reference has been made to the functional significance of the fourth order filter at step S-5 of the flow diagram of FIG. 5. As disclosed, the filter acts to extract an estimated acceleration rate error $\delta \hat{A}$ that is then applied to an error model at step S-6 to generate a tilt rate. Gyro error can then be obtained from the tilt rate. The fourth order filter mechanization of FIG. 7 is employed with regard to each of the two level computed platform axes. A sequence of measurements is collected by the filter with respect to each axis during the data collection period while the aircraft is still parked in its initial alignment heading.

The filter provides measurements of estimated average rates of change of horizontal acceleration for each of the two level axes. Since the aircraft is nominally stationary during the extended alignment period, the true average should be zero. Therefore, non-zero measurements must reflect gyro bias and other system errors. Such other errors are estimated (discussed below) and their effects are subtracted to obtain measurements of the gyro bias errors. The relationship between horizontal acceleration rate and gyro bias error follows from the error model of the navigation mode of FIG. 6.

Returning to FIG. 7, the horizontal acceleration $A_y$ is obtained (corrected for misalignments, scale factor errors, and both fixed and temperature-dependent bias errors based upon the existing thermal model calibration) from the navigation mode of the INS. The software compensated body axis accelerometer outputs are resolved through computed direction cosines to obtain acceleration in the system of the computed platform axes.

The fourth order filter comprises a fourth order position tracking loop with acceleration aiding from the input acceleration $A_y$. The loop tracks an input position reference $P_{yref}$ that is assumed to be zero in view of the parked attitude of the aircraft during extended alignment. The aircraft is not perfectly motionless throughout extended alignment but is subject to random bounded motion due to wind gusts or loading. On average, such motion should have no net value. A computed relative position $P_y$ is obtained through successive integrations at steps S-17 and S-18. The relative position $P_y$ is subtracted at step S-19 from the reference position $P_{yref}$ (set equal to zero) to obtain an error signal $e_y$. This error signal is fed back through gains $K_1$, $K_2$, $K_3$ and $K_4$, generated by an off-line Kalman filter, at steps S-20, S-21, S-22 and S-23 and input to integration steps S-18, S-17, S-25 and S-24 respectively. As a result of the acceleration aiding from $A_y$, the integrations at steps S-24 and S-25 provide estimates of acceleration rate error and acceleration error respectively.

VII. Navigation Mode Error Model

Figure 8:
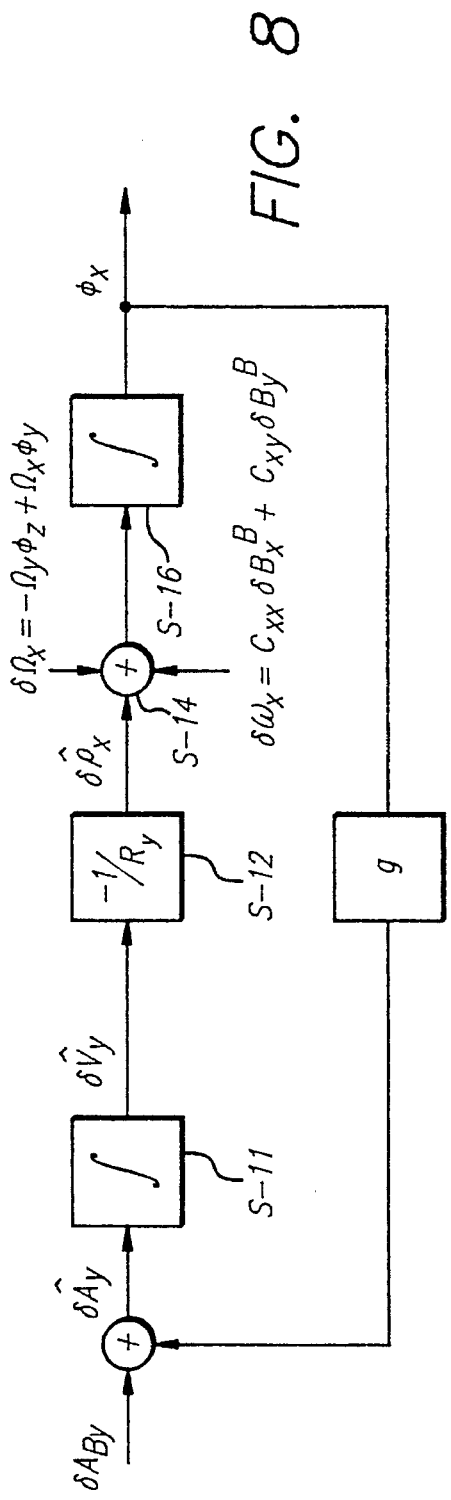
FIG. 8 is a control system diagram of the error model of the INS navigation mode as illustrated in FIG. 6.

FIG. 8 is a control system diagram of the Shuler loop error model of the y-channel navigation mode mechanization of FIG. 6. This error model is derived by differentiating the navigation mode mechanization diagram.

The error model indicates how various error sources contribute to the total estimate of acceleration error $\delta \hat{A}_y$ and propagate through the navigation mode of INS operation. The various errors are indicated on the diagram. The technique, derivation and use of such Shuler loop error models is well understood in the art and explained, for example, in G. R. Pitman, "Inertial Guidance", John Wiley & Sons, New York (1962).

The integration at step S-11 generates a y-axis velocity error, $\delta \hat{V}_y$. The input to the integration step S-11 is the total acceleration error $\delta A_y$. This is the sum of the accelerometer bias error due to resolution of the body accelerometer bias error and gravity feedback resulting from computed platform axis misalignment, $\phi_x$, about the x-axis. That is, $$\delta A_y = \delta A_{By} + g \cdot \phi_x \quad (5)$$

where the fourth order filter estimates the derivative of this sum in g's.

The derivative of the first term is zero as the accelerometer errors and direction cosines are approximately constant when the aircraft is parked. The derivative of the total y-axis acceleration error (in g's) is therefore equal to the level axis tilt rate about x as described below:

$$\delta \dot{A}y/g = \dot{\phi}_x \quad (6)$$

This is the quantity that is estimated by the integration step S-24 of the fourth order filter as illustrated in FIG. 7.

The relationship of the above-defined term to the errors that occur during navigation mode operation is seen in the error model diagram of FIG. 8. As shown, the tilt rate $\dot{\phi}_x$, defined as $$\dot{\phi}_x = C_{xx}\delta B_x^B + C_{xy}\delta B_y^B - \delta V_y/R_y - \omega_y\phi_z + \omega_x\phi_y \quad (7)$$

is input to the integration step S-16. The tilt rate is seen to comprise terms pertaining to the resolution of gyro bias errors through the direction cosines, a term for y-axis velocity error divided by radius of curvature and terms for resolving earth rate through misalignment of the computed platform axes. In deriving the gyro bias error from the measured tilt rate, a first adjustment is made by adding an estimate of the velocity error term and employing the fact that the earth rate error term due to the tilt misalignment about the y axis is negligible. The first adjusted tilt rate measurement $\dot{\phi}_x'$ is indicated below.

$$\dot{\phi}_x' = \dot{\phi}_x + \delta \hat{V}_y/R_y = C_{xx}\delta B_x^B + C_{xy}\delta B_y^B - \omega_y\phi_z \quad (8)$$

The velocity error estimate employed for the preceding first adjustment is obtained by subtracting the estimated relative velocity (due to wind gusts and loading) obtained from the integration step S-17 from the total computed velocity $V_y$.

A second adjustment is then made by adding an estimate of the earth rate misalignment term due to heading error. This is the computed platform axis misalignment about the z axis. The second adjusted measurement, denoted $\phi_x''$, is as follows:

$$\phi_x'' = \phi_x' + \omega_y \hat{\phi}_z = C_{xx}\delta B_x^B + C_{xy}\delta B_y^B \tag{9}$$

The second adjustment is made after all measurements have been collected. This follows from the fact that the estimated heading error (generated at step S-7 of FIG. 5) is not available until the taxiing period has concluded and the craft is airborne. As indicated by the above equation, the second adjusted measurement is a linear equation in the two unknown gyro bias errors, $\delta B_x^B$ and $\delta B_y^B$.

Similar adjustments are made to measurements obtained by the fourth order filter that processes the x-channel. The sets of equations for the two channels (at a given measurement time i) are solved for the estimated bias errors of the two level axes at each measurement time i. The temperatures associated with the measurement times which have been stored can now be associated with the estimated gyro biases. This process is indicated in FIG. 5 as a portion of the step S-8.

VIII. Updating Existing Thermal Calibration

Figure 9:
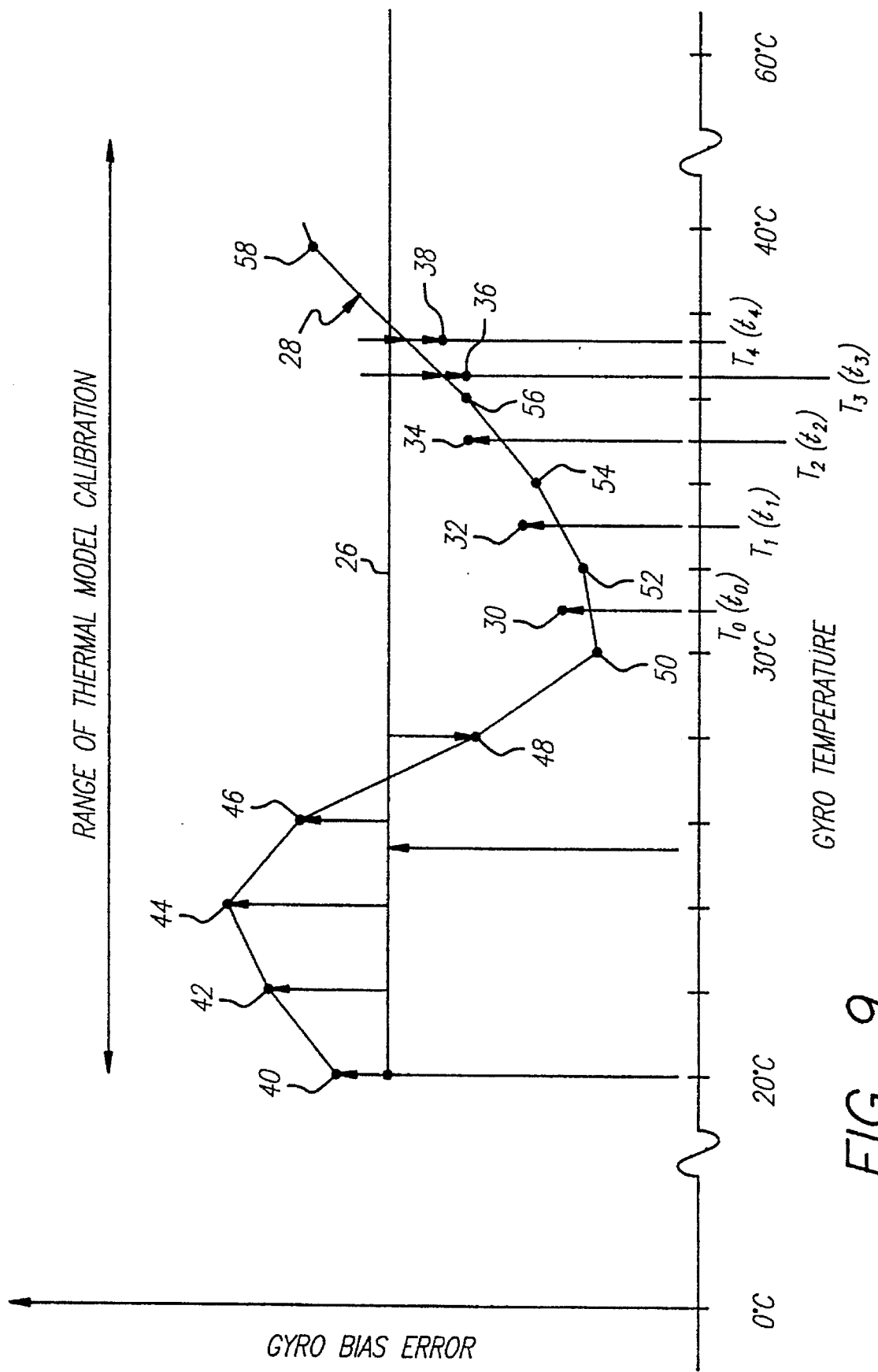
FIG. 9 is a graph for illustrating the relationship between the data points generated in accordance with the method of the invention and those of an existing thermal gyro bias error model calibration.

FIG. 9 is a graph that illustrates the relationship between data points generated in accordance with the invention and those of an existing (i.e. prior to updating) thermal bias error calibration. As can be seen, the gyro bias error-versus-temperature characteristic is generally composed of sinusoids with a D.C. offset. The curve 28 describes the existing calibration. A set of points 30, 32, 34, 36, 38 depicts the newly-determined values of gyro bias error determined during the most recent extended alignment period. Such points fall at irregularly-spaced gyro temperatures $T_0$, $T_1$, $T_2$, $T_3$, and $T_4$ corresponding regularly-spaced sampled measurement times $t_0$, $t_1$, $t_2$, $t_3$ and $t_4$. By comparing the points 30 through 38 with points 40 through 58 of the existing calibration, it may be noted that the "new" data points generally lie between the temperature reference points of the existing calibration.

As each measurement temperature $T_i$ normally occurs in the interval between two coordinate temperatures of the existing thermal model calibration (i.e. $T_{Ni-1} \leq T_i \leq T_{Ni}$), measurements are converted in the invention to bias errors at the thermal model coordinate temperatures. Estimation utilizing temperature differences between the measurement temperature and the adjacent coordinate temperatures, $\Delta T = T_{Ni} - T_{Ni-1}$, is employed to determine a two-element observation matrix defined as follows:

$$h_{1i} = T_{Ni} - T_i/\Delta T, \ h_{2i} = T_i - T_{Ni-1}/\Delta T \tag{10}$$

The observation matrix is employed, in conjunction with previously-estimated bias error variances ($P_{Ni-1}$, $P_{Ni}$) at the coordinate temperatures, $T_{Ni-1}$, $T_{Ni}$, to determine the variance ($\rho_i^2$) of the measurement in accordance with the following relationship:

$$(\rho_i^2)^- = h_{1i}^2 P_{Ni-1}^- + h_{2i}^2 P_{Ni}^- + R_1 \tag{11}$$

Where $R_i$ is a measurement noise value. See equation 24, below. A weighted average is then computed in accordance with the above equation and the following relationship:

$$1/(\rho_{DC}^2)^+ = 1/(\rho_{DC}^2)^- + [1/(\rho_1^2)^- + \ldots + 1/(\rho_M^2)^-] \tag{12}$$

Where $\rho_{DC}^2 (=P_{DC})$ represents the variance of the fixed portion of the gyro bias. Employing the above, a correction to the DC bias estimate, $\delta \hat{B}_{DC}$, is as follows:

$$[1/(\rho_1^2).Z_1'' + 1/(\rho_2^2).Z_2'' + \ldots + 1/(\rho_M^2).Z_M'']/[1/(\rho_{DC}^2)^+] \tag{13}$$

where $$\hat{B}_{DC}^+ = \hat{B}_{DC}^- + \delta B_{DC} \tag{14}$$

and $z_i''$ is the i-th adjusted tilt rate ($\phi$) as defined by equation 9. The above DC correction is subtracted from the measurements before determining the AC corrections. That is, $$Z_i''' = Z_i'' - \delta B_{DC} \tag{15}$$

Weighting factors are determined as follows:

$$D_i = h_{1i}^2 P_{Ni-1} + h_{2i}^2 P_{Ni} + P_{DC}^+ + R_i \tag{16}$$

$$K_{1i} = h_{1i}.P_{Ni-1}^-.D_i^{-1}; \ K_{2i} = h_{2i}P_{Ni}^-.D_i \tag{17}$$

The weighting factors are employed to allocate the measurement to adjustments in the previously-estimated bias errors at the adjacent coordinate temperatures as follows:

$$\delta B_{AC,Ni-1} = K_{1i}Z_i''', \ \delta B_{AC,Ni} = K_{2i}Z_i''' \tag{18}$$

The error variances are then readjusted to reflect the new information:

$$P_{AC,Ni-1}^+ = P_{AC,Ni-1}^- - K_{1i}h_{1i}P_{AC,Ni-1}^-$$

$$P_{AC,Ni}^+ = P_{AC,Ni}^- - K_{2i}h_{2i}P_{AC,Ni}^- \tag{19}$$

The variances are increased as a function of operating time between measurement sets. The basic equation is given as follows:

$$P = P_{old}e^{-2\Delta t/\tau} + \tau/2 \ [Q(1-e^{-2\Delta t/\tau})] \tag{20}$$

Where t is the total time of system operation at the present update, $t_{old}$ the total time of operation at the previous update, $\Delta t (=t-t_{old})$ the elapsed time since the previous update, P the variance at the present update and $P_{old}$ the variance at the previous update.

The above equation represents a propagation algorithm for a first order Markoff process. This equation algorithm is applied to the AC variance and to the DC variance at each of the coordinate temperatures; of the existing thermal model.

IV. Correcting Weightings For Taxi Time

The heading error correction (step S-7 of FIG. 5) is based upon estimates of cross-track velocity taken during the taxi time between the end of extended alignment and takeoff. Such time will vary from flight to flight, thereby effecting the accuracy of the D.C. correction (step S-8 of FIG. 5). As a result, a residual amount D.C. bias due to non-compensation of heading error will be found in each of the A.C. gyro bias error estimates and the amount of such residual D.C. gyro bias error will vary from flight as the variance of the heading error is affected by taxi time.

The variance of the individual measurements in each measurement set is computed by determining the accuracy of the heading error computation that took place at the end of the data collection period. Such accuracy is determined by the reduction in variance in the heading error. The variance of an estimate of gyro bias error as measured during the data collection (extended alignment) period is expressed as:

$$\rho_o^2 = \omega_N^2 P\phi_z\phi_z(o) \tag{21}$$

Where $P\phi_z\phi_z$ is the covariance of the heading error measurement $\phi_z$ based upon the previous flight. After the data collection period, the variance associated with the heading error after taxiing is:

$$\rho_E^2 = \omega_N^2 P\phi_z\phi_z(t_F) \tag{22}$$

Where $t_F$ is the length of the post-alignment taxiing period.

One may follow the accuracy of the measurements based upon a taxiing period of given length by looking at the covariance value. The covariance value will decrease as the taxiing period is extended. The degree to which the initial covariance value is reduced provides an indication of measurement accuracy.

The variance of the error in the east axis angular rate $(\omega_N\phi_z)$, $R_E$, can be shown to be:

$$R_E = \rho_E^2/(1 - \rho_E^2/\rho_o^2) \tag{23}$$

The variance of the error along the north axis, $R_N$, may be assumed to be a fixed value that is determined through minibiasing during initial alignment. The measurement noise values $(R_x, R_y)$ along the level (x,y) axes are then:

$$R_x = R_E \cos^2\psi_T + R_N \sin^2\psi_T$$

$$R_y = R_E \sin^2\psi_T + R_N \cos^2\psi_T \tag{24}$$

Thus it is shown that the present invention provides a method for in-field updating of the thermal model of gyro bias error in a strapdown inertial navigation system. By employing the teachings of the invention one may obtain an in-field calibrations of the gyro thermal model with each flight. As a consequence, down time for factory re-calibration of navigation instruments is dramatically reduced. In addition to the obvious economics inherent in use of the method, the continual updating of some or all of the calibration data points continually assures maximum accuracy of gyro-generated data.

While this invention has been described with reference to its presently-perferred embodiment it is not limited thereto. Rather, the present invention is only limited insofar as it is defined by the following set of patent claims and includes within its scope all equivalents thereof.

What is claimed is:

1. A method for correcting gyro outputs in a strapdown aircraft inertial navigation system of the type that includes an associated existing thermal gyro bias error model calibration comprising the steps of:

a) orienting said aircraft to an initial alignment heading; then b) activating said system to navigation mode; then c) receiving measurements of angular rate and linear acceleration relative to said aircraft's body axes from said system at regularly-spaced points in time; and d) detecting the temperatures of the gyros of said strapdown system at said points in time; then e) determining aircraft acceleration with respect to a computed platform reference from said angular rate and linear acceleration measurements; then f) determining estimated acceleration rate errors in said gyro outputs from said aircraft acceleration with respect to said computed platform reference; then g) determining tilt rate errors in said gyro outputs; then h) repeating steps c through g throughout and until completion of an extended alignment period to generate a first set of data points, each data point comprising an associated pair of values of gyro tilt rate and gyro temperature; then i) converting each of said gyro tilt rates into a gyro bias error; and j) storing said converted values as a second set of data points; then k) taxiing said aircraft; and l) determining a heading error by estimating cross-track velocity during said taxiing; then m) converting each of said second set of data points to an adjusted gyro bias error by subtracting said heading error from each of said second set of data points; then n) storing said adjusted gyro bias errors as a third set of data points; then o) incorporating said third set of data points into said existing thermal gyro bias error model calibration to form an updated calibration; then p) continuously measuring the temperatures of said gyros; and then q) repeatedly adjusting the angular rate outputs of said gyros with bias error values selected from said updated calibration in view of said measured gyro temperatures.

2. A method as defined in claim 1 wherein the step of determining aircraft accelerations with respect to a computed platform reference is performed by said inertial navigation system.

3. A method as defined in claim 1 wherein the step of determining estimated acceleration rate errors in said gyro outputs is accomplished by means of a fourth-order filter.

4. A method as defined in claim 1 wherein the step of determining tilt rate is accomplished by means of the error model of said navigation mode.

5. A method as defined in claim 1 wherein the step of converting said gyro tilt rates into gyro bias errors is accomplished by means of a transformation of the relationship between tilt rate and navigation mode error sources.

6. A method as defined in claim 5 wherein said transformation comprises a first adjustment and a second adjustment.

7. A method as defined in claim 6 wherein said first adjustment comprises the steps of:

a) estimating the effect of velocity error upon tilt rate; then b) adding said estimate of velocity error to said tilt rate; and then c) assuming the effect of tilt misalignment with respect to the other computed platform axis is negligible.

8. A method as defined in claim 7 wherein said second adjustment comprises the steps of:

a) estimating earth rate misalignment due to heading error; and then b) adding said estimate of earth rate misalignment to said first adjustment.

9. A method as defined in claim 1 wherein the step of incorporating said third set of data points into said existing thermal gyro bias error model calibration further includes the step of interpolating said third set of data points with respect to the temperature data of said existing thermal gyro bias error model.

10. A method as defined in claim 9 wherein said step of interpolating further includes the step of estimating the variance of each of said interpolated values of gyro bias error.

11. A method as defined in claim 10 wherein the step of interpolating additionally includes the step of weighting said interpolated values in accordance with the estimated variance thereof.

12. A method for in-field updating of the gyro bias error-versus-temperature calibration of an aircraft strapdown inertial navigation system comprising a plurality of gyro bias error values associated with gyro temperature, said method comprising the steps of:

a) performing an initial alignment; then b) turning said system to navigation mode; then c) measuring the temperatures of the gyros of said inertial navigation system in said initial alignment heading; and d) making estimates of gyro bias error in said initial alignment heading; then e) associating said estimates of gyro bias error with said measurement temperatures; then f) changing the heading of said aircraft and taxiing; and g) estimating aircraft heading error; then h) subtracting said aircraft heading error from each of said estimates of gyro bias error to generate a plurality of updated gyro bias error-and-temperature data points; then i) interpolating said updated gyro bias error-and-temperature data points to generate updated values of gyro bias error that correspond to the temperature values of an existing gyro bias error-versus-temperature calibration; and then j) adjusting said existing calibration by means of said updated values of gyro bias error.

13. A method as defined in claim 12 wherein said gyros are ring laser gyroscopes.

14. A method as defined in claim 13 further comprising the step of determining a variance value associated with each of said updated values of gyro bias error.

15. A method as defined in claim 14 further including the step of weighting each of said updated gyro bias error values in accordance with the associated variance.

16. A method for correcting the gyros of a strapdown inertial system for temperature-induced gyro bias errors comprising the steps of:

a) generating an initial thermal model calibration; then b) setting said inertial navigation system to alignment mode; then c) performing an initial alignment; then d) switching said system to navigation mode; then e) measuring outputs of said inertial navigation system while said aircraft is in the initial alignment heading; and f) measuring the temperatures of said gyros; then g) generating a set of values of gyro bias error from said measured outputs; then h) associating each of said values with a measured value of gyro temperature; then i) changing the heading of said aircraft; and j) taxiing said aircraft; and k) measuring the output of said inertial navigation system; then l) determining the heading errors of said gyros; then m) subtracting said heading errors from the values of gyro bias error to create a set of values of gyro bias errors associated with measured gyro temperatures; then n) interpolating said last-named set of values to correspond to the temperatures of said initial thermal model calibration; then o) creating an updated thermal model calibration by incorporating said interpolated values into said initial thermal model calibration; then p) flying said aircraft; and q) measuring the temperatures of said gyros; and then r) determining gyro bias error corresponding to said gyro temperatures from said updated thermal model calibration; and then s) compensating the outputs of said gyros in accordance with said gyro bias errors.

17. A method as defined in claim 16 wherein the step of interpolating further includes the step of associating a variance value with each of said updated values of gyro bias error.

18. A method as defined in claim 17 further including the step of weighting each of said updated gyro bias error values in accordance with the associated variance.

\* \* \* \* \*